United States Patent
Yamazaki

(10) Patent No.: US 6,514,372 B1
(45) Date of Patent: Feb. 4, 2003

(54) MANUFACTURING METHOD AND MANUFACTURING APPARATUS OF THIN FILM LAMINATED ARTICLE

(75) Inventor: Akio Yamazaki, Suita (JP)

(73) Assignee: New Create Corporation, Osaka (JP)

( * ) Notice: Subject to any disclaimer, the term of this patent is extended or adjusted under 35 U.S.C. 154(b) by 0 days.

(21) Appl. No.: 09/541,688

(22) Filed: Apr. 3, 2000

(30) Foreign Application Priority Data

Aug. 10, 1999 (JP) .......................................... 11-226214

(51) Int. Cl.[7] .............................................. B32B 31/18
(52) U.S. Cl. ..................... 156/256; 156/353; 156/517; 156/580
(58) Field of Search ..................... 73/1.79; 414/222.04, 414/222.05, 222.07, 222.08, 222.11, 749.3, 749.1, 752.1, 922, 907; 83/94; 156/182, 248, 249, 256, 261, 391, 530, 540, 541, 580

(56) References Cited

U.S. PATENT DOCUMENTS 5,224,250 A * 7/1993 Hamuro et al. .......... 156/89.11

FOREIGN PATENT DOCUMENTS

JP          9225924 A   *  9/1997  ........... B28B/11/00

* cited by examiner

Primary Examiner—Richard Crispino
Assistant Examiner—Sing P Chan
(74) Attorney, Agent, or Firm—Rader, Fishman & Grauer PLLC

(57) ABSTRACT

This invention relates to a manufacturing method and manufacturing apparatus of thin film article by cutting a thin film sheet conveyed as being mounted on a conveying medium of thin film shape into a special size to obtain a thin film sheet piece, and conveying and laminating said thin film sheet piece at a laminating position by a ball-screw mechanism, wherein the cutting position of said thin film sheet is determined on the basis of an image taken by imaging means moving in synchronism with conveyance of said thin film sheet piece.

5 Claims, 5 Drawing Sheets

MANUFACTURING METHOD AND MANUFACTURING APPARATUS OF THIN FILM LAMINATED ARTICLE

TECHNICAL FIELD OF THE INVENTION

The present invention relates to a manufacturing method and a manufacturing apparatus of a thin film laminated article. More particularly, it relates to a manufacturing method and a manufacturing apparatus of a thin film laminated article for manufacturing laminated ceramic capacitor or the like by cutting, for example, a ceramic sheet on which an electrode pattern is formed into a sheet piece of a specified size, and laminating.

BACKGROUND ART

Hitherto, in a manufacturing apparatus for manufacturing electronic components such as laminated ceramic capacitors, a CCD imaging device is used for positioning in the case of printing an electrode pattern on a ceramic sheet formed on a flexible support called a carrier film, or cutting the ceramic sheet on which the electrode pattern is printed into a sheet piece of a specified size (refer to Japanese Laid-open Patent Publication No. 8-167544 and Japanese Laid-open Patent Publication No. 10-284346).

FIG. 5 shows a schematic structure of the thin film laminated article manufacturing apparatus of the prior art for positioning by using a CCD imaging device when cutting the ceramic sheet on which the electrode pattern is printed into a sheet piece of a specified size.

This manufacturing apparatus 100 comprises a film conveying mechanism 101 for conveying a carrier film F on the surface of which ceramic sheet G is formed, a cutting and conveying mechanism 102 for cutting the ceramic sheet G on the surface of the carrier film F conveyed by this conveying mechanism 101 into a sheet piece of a specified size, and conveying to a specified position, a positioning mechanism 103 for positioning when the cutting and conveying mechanism 102 cuts off the ceramic sheet G, and a laminating and compressing mechanism 104 for laminating and compressing the ceramic sheet conveyed to the specified position by the cutting and conveying mechanism 102.

The film conveying mechanism 101 has a delivery device 105 in which the carrier film F having the ceramic sheet G formed on the surface is set, and the carrier film F delivered from this delivery device 105 is conveyed to a take-up device 107 while being guided by rolls 106, and is taken up.

The cutting and conveying mechanism 102 includes a conveying unit 110 having a cutting blade 108 for cutting the ceramic sheet G into a sheet piece of a specified size on a peeling table 115 used as a support stand, and a suction board 109 for sucking the ceramic sheet G, a rod-less fluid cylinder 111 for moving the conveying unit 110 between a cut-off position for cutting off the ceramic sheet G by the conveying unit 110 and a laminating position for laminating and compressing the sheet piece by the laminating and compressing mechanism 104, and a ball-screw mechanism 112 for moving this rod-less fluid cylinder 111 by a short distance for fine adjustment.

The positioning mechanism 103 includes a CCD imaging device 113a for imaging the positioning mark printed at a specified interval corresponding to the electrode pattern on the ceramic sheet G, and an image processing device 113b for processing the image taken by the CCD imaging device 113a, and by the correction moving distance obtained by processing the image information of the positioning mark taken by this CCD imaging device 113a by the image processing device 113b, it is designed to determine positioning when moving the conveying unit 110 from the laminating position to the cut-off position.

The laminating and compressing mechanism 104 is composed of a press table 114 for laminating and compressing the ceramic sheet conveyed up to the laminating position by the cutting and conveying mechanism 102, and a hydraulic cylinder 150 for pushing up this press table 114.

In this prior art, the conveying unit 110 is moved by an almost full distance by the rod-less fluid cylinder 111, and the conveying unit 110 is positioned so that the ball-screw mechanism 112 may move the cylinder 111 by a short distance. It hence prevents deviation of position of the sheet piece being laminated and compressed due to thermal expansion in the axial direction of the ball-screw shaft 112a by friction heat, for example, when moving the conveying unit 110 the full distance by using the ball-screw mechanism 112.

Referring next to FIG. 6 and FIG. 7, in the case of moving the full distance by using the ball-screw mechanism 112, deviation of position of sheet piece being laminated and compressed due to thermal expansion in the axial direction of the ball-screw shaft 112a due to friction heat is explained below. FIG. 6 shows a starting state of the manufacturing apparatus 100, and FIG. 7 shows a laminating state of a specified number of sheet pieces.

In FIG. 6 and FIG. 7, point A shows the bearing position at the leading end of the ball-screw shaft 112a of the ball-screw mechanism 112. Point B1 denotes the reference position of the conveying unit 110 stopped at the laminating position, that is, the center of the press table 114, and the distance from point A to point B1 is L1. Point B2 shows the position of the conveying unit 110 stopped at the laminating position actually at the point shown in FIG. 7. That is, in the state in FIG. 6, the position of the conveying unit 110 coincides with the center of the press table 114, but in the state in FIG. 7, the stopping position at the laminating position of the conveying unit 110 is point B2, being deviated from point B1 by ΔL1 in the leftward direction in the drawing due to the effect of thermal expansion.

Point C1 is a fixing position of the CCD imaging device 113a, and is also a reference position at the cut-off position of the positioning mark printed on the ceramic sheet G. Point C1 is a point moved from point B1 by L2 in the leftward direction in the drawing.

Point D1 shows a position when the conveying unit 110 is moved to the cut-off position, assuming that the deviation detected by the CCD imaging device 113a to be 0. Point D1 coincides with point C1, and actually distance L2 is corrected depending on the deviation of positioning mark from point C1, and the moving distance when the conveying unit 110 is moved from point B1 to the cut-off position.

Point D2 shows a position in which the conveying unit 110 is stopped at the cut-off position, assuming that the deviation detected by the CCD imaging device 113a to be 0 at the point shown in FIG. 7. The distance from point D2 to point B2 is L2+ΔL2 due to the effect of thermal expansion of the ball-screw shaft 112a. Therefore, in the state shown in FIG. 7, the conveying unit 110 is stopped at a position deviated from point D1 by ΔL1+ΔL2 in the leftward direction in the drawing.

As a result, at the point in FIG. 7, the sheet piece laminated at the laminating position is deviated from the initial position by ΔL1 in the leftward direction in the drawing, and the position of the positioning mark (that is, the position of the electrode pattern; in FIG. 7, line segment E shows the position of the positioning mark) is deviated by ΔL2 in the rightward direction in the drawing.

Thus, when moving the conveying unit 110 between the cut-off position and laminating position by the ball screw mechanism 112, since the ball screw shaft 112a is elongated by thermal expansion from start until the temperature of the ball-screw shaft 112a is stabilized, the electrode pattern of the laminated sheet pieces is deviated. In this respect, in the prior art, since the conveying unit 110 is moved in the majority between the cut-off position and laminating position by the rod-less fluid cylinder 111, deviation of electrode pattern due to effect of thermal expansion of the ball-screw shaft 112a may be suppressed to an ignorable level.

In the prior art, however, the manufacturing apparatus requires a relatively complicated mechanism of the rod-less fluid cylinder 111, and hence the mechanism of the manufacturing apparatus is complicated, and the manufacturing cost of the thin film laminated body is increased.

The invention is devised in the light of the problems of the prior art, and it is hence an object thereof to present a manufacturing method and a manufacturing apparatus of a thin film laminated article capable of eliminating adverse effects on the product precision by thermal expansion of members without complicating the mechanism.

SUMMARY OF THE INVENTION

The manufacturing method of thin layer laminated article of the invention is characterized by cutting a thin film sheet conveyed as being mounted on a conveying medium of thin film shape into a specified size to obtain a thin film sheet piece, and conveying and laminating the thin film sheet piece at a laminating position by a ball-screw mechanism, in which the cutting position of the thin film sheet is determined on the basis of the image taken by imaging means moving in synchronism with conveyance of the thin film sheet piece.

Preferably, in the manufacturing method of thin layer laminated article of the invention, the center of the laminating position is the middle position between the center of the cutting position and the bearing position of the ball-screw shaft leading end of the ball-screw mechanism.

On the other hand, the manufacturing apparatus of thin layer laminated article of the invention comprises a conveying medium conveying mechanism for conveying a conveying medium of thin film shape on which a thin film sheet is mounted, cutting means for cutting the thin film sheet into a thin film sheet piece of a specified size, holding and conveying means for holding the thin film sheet piece and conveying from a cutting position to a laminating position, a ball-screw mechanism for conveying the holding and conveying means from the cutting position to laminating position, imaging means designed to move in synchronism with the move of the holding and conveying means, and image processing means for processing the image from the imaging means, in which the moving distance of the holding and conveying means is corrected depending on a correction moving distance from the image processing means.

Preferably, in the manufacturing apparatus of thin layer laminated article of the invention, the center of the laminating position is the middle position between the center of the cutting position and the bearing position of the ball-screw shaft leading end of the ball-screw mechanism.

Preferably, in the manufacturing apparatus of thin layer laminated article of the invention, the cutting means includes a first cutting mechanism for cutting the thin film sheet in the conveying direction and a second cutting mechanism for cutting in a direction orthogonal to the conveying direction, and the second cutting mechanism is disposed on the holding and conveying means.

Since the invention is thus constituted, if the holding and conveying means is conveyed to a position deviated from a preset cut-off position due to thermal expansion of the ball-screw shaft of the ball-screw mechanism, the holding and conveying means can be set at the specified position by the correction moving distance obtained by processing the image taken by the imaging means. It hence eliminates adverse effects of thermal expansion of ball-screw shaft on the product precision.

DETAILED DESCRIPTION

Referring now to the accompanying drawings, an embodiment of the invention is described below, but it must be noted that the invention is not limited to the illustrated embodiment alone.

Figure 1:
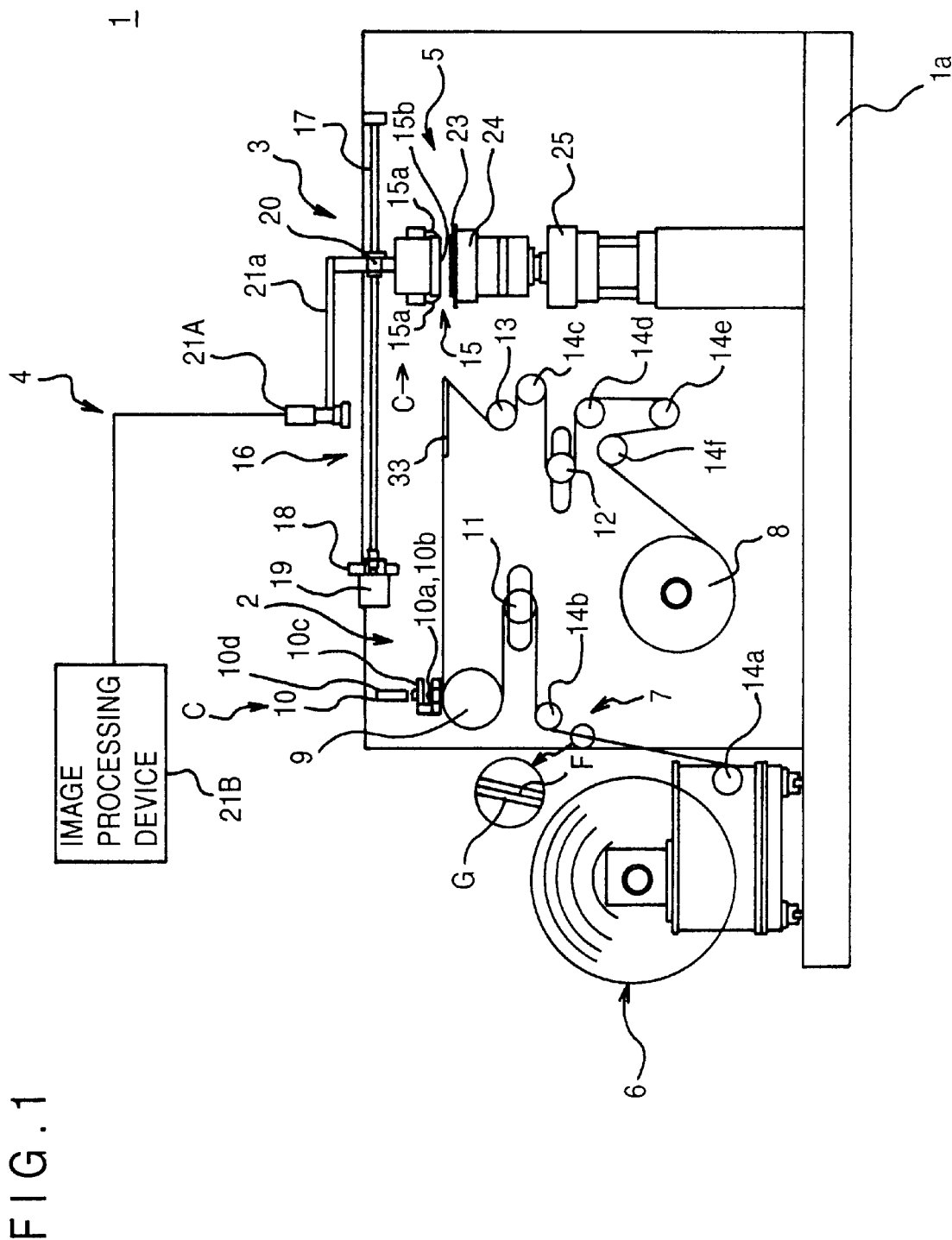
FIG. 1 is a front view showing a schematic constitution of a manufacturing apparatus of thin film laminated article according to an embodiment of the invention.
Figure 2:
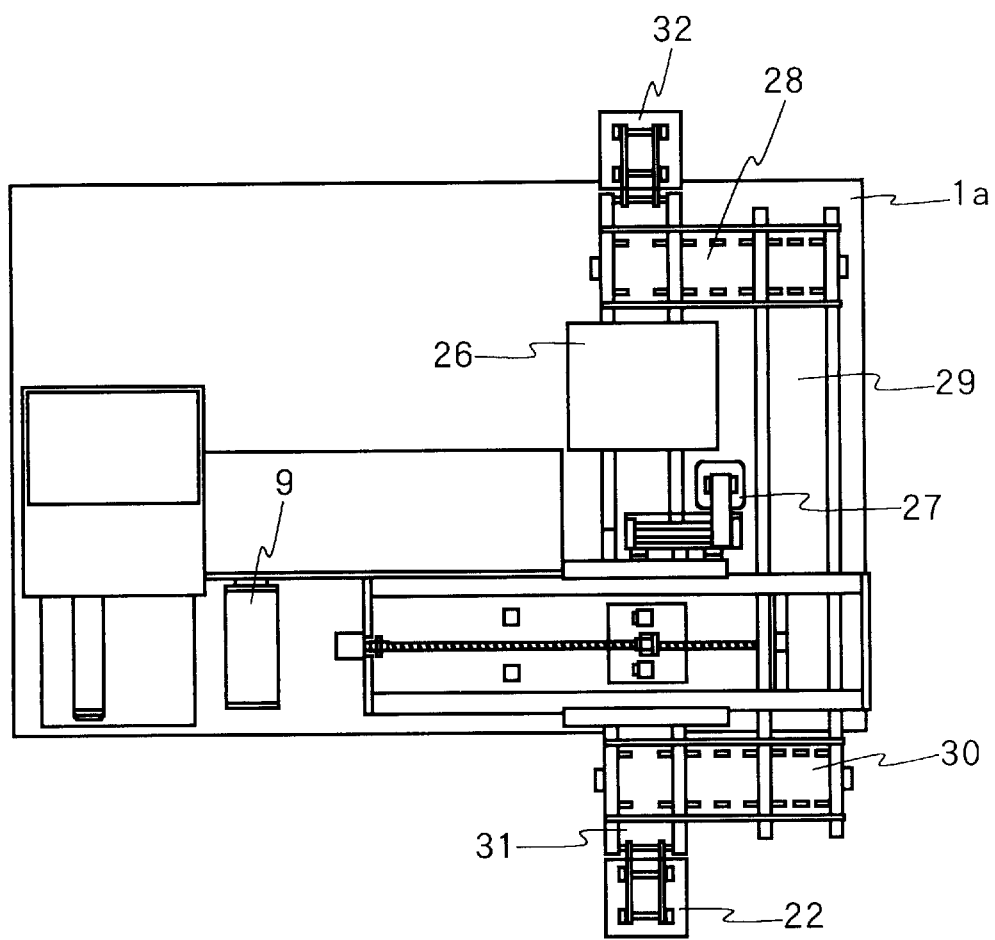
FIG. 2 is a plan view showing a schematic constitution of the manufacturing apparatus of thin film laminated article according to the embodiment of the invention.

FIG. 1 and FIG. 2 show a schematic structure of a manufacturing apparatus in which a manufacturing method of a thin film laminated body in an embodiment of the invention is applied.

This manufacturing apparatus 1 comprises primarily a film conveying mechanism 2 for conveying so that a carrier film F on the surface of which a ceramic sheet G is formed may be fed by a specified length each, a cutting mechanism C for cutting the ceramic sheet G on the surface of the carrier film F conveyed by this conveying mechanism 2 into a sheet of a specified size, a sheet conveying mechanism 3 for conveying this sheet piece to a specified position, a positioning mechanism 4 for positioning when the cutting mechanism C cuts off the ceramic sheet G, and laminating and compressing mechanism 5 for laminating and compressing the ceramic sheet G conveyed up to the specified position by the sheet conveying mechanism 3.

Herein, the carrier film F is composed of a hard resin material such as biaxially drawn polyethylene terephthalate film (polyester film) or biaxially drawn polypropylene film.

On the other hand, the ceramic sheet G is a slurry composition composed of various ceramic dielectric power materials, resin binders and solvents formed on the surface of the carrier film F by coating method or printing method. The thickness of this ceramic sheet G is about, for example, 2 to 30 μm.

On the upper surface of the ceramic sheet G, a conductive material containing palladium, silver, nickel or other metal powder is printed as a rectangular electrode pattern, and the positioning mark is printed at a specified interval corresponding to the electrode pattern for the purpose of positioning when cutting off the ceramic sheet G.

The film conveying mechanism 2 has a delivery device 6 in which the carrier film F having the ceramic sheet G formed on the surface is set, and the carrier film F delivered from this delivery device 6 is conveyed up to a take-up device 8 while being guided by a group of rolls 7, and is taken up.

Of the group of rolls 7, a suction roll 9 has a vacuum outer circumference, and rotates while sucking the carrier film F, and conveys the carrier film F. Above the suction roll 9, there is a longitudinal cutter 10 composing the cutting mechanism C for cutting only the ceramic sheet G longitudinally in the running direction on the suction roll 9 as a support stand. The longitudinal cutter 10 is constituted so that a rotary blade support member 10c for supporting, for example, two circular rotary blades 10a, 10b may be thrust toward the suction roll 9 with a proper force by a thrusting member 10d.

The carrier film F sent by rotation of the suction roll 9 is provided with a proper tension by a supply side tension roll 11, a take-up side tension roll 12, and a moving roll 13, and conveyed to the take-up device 8 while being guided by guide rollers 14a, 14b, 14c, 14d, 14e, 14f.

The sheet conveying mechanism 3 includes a conveying unit 15 for cutting the ceramic sheet G in a direction orthogonal to the running direction, which the ceramic sheet G has been cut prior in the running direction by a longitudinal cutter 10 before reaching the conveying unit 15 and form into a sheet piece of a specified size, and sucking and holding this sheet piece, and a ball-screw mechanism 16 for moving this conveying unit 15 between the cut-off position for cutting off the ceramic sheet G, and the laminating position for compressing and laminating the cut-off ceramic sheet G by the laminating and compressing mechanism 5.

The conveying unit 15 includes a lateral cutter 15a for cutting the ceramic sheet G in a direction orthogonal to the running direction on a peeling table 33 as a support stand to form into a sheet piece of a specified size, and a suction board 15b for sucking and holding the sheet piece. The ball-screw mechanism 16 comprises a ball-screw shaft 17 having one end (leading end) supported on a base 1a of the manufacturing apparatus 1, a servo motor 19 for rotating and driving the ball-screw shaft 17 having other end (rear end) of the ball-screw shaft 17 connected through a shaft coupling 18, and a ball female screw 20 fixed in the conveying unit 15 to be engaged with the ball-screw shaft 17. As clear from the description above, in the embodiment, the cutting mechanism C is composed of the longitudinal cutter, that is, the first cutting mechanism, and the lateral cutter, that is, the second cutting mechanism.

The shaft coupling 18 is designed to absorb the elongation so as not to break the machine when the ball-screw shaft 17 is elongated in the axial direction due to thermal expansion. A specific constitution is known in the prior arts.

The positioning mechanism 4 includes a CCD imaging device 21A for imaging the positioning mark printed at a specified interval corresponding to the electrode pattern on the ceramic sheet G, and an image processing device 21B for processing the image taken by this CCD imaging device 21A, and depending on the correction amount obtained by processing the image information of the positioning mark taken by the CCD imaging device 21A by the image processing device 21B, it is designed to correct the distance when the ball-screw mechanism 16 moves the conveying unit 15 from the laminating position to the cut-off position.

The CCD imaging device 21A is engaged with the ball female screw 20 through a support metal 21a, that is, coupled to the conveying unit 15 through the ball female screw 20, and it is designed to move integrally with the conveying unit 15.

The laminating and compressing mechanism 5 includes a press table 24 for supporting a carrier plate 23 supplied from a carrier plate feed device 22 and conveyed by a carrier plate conveyor 31, and a hydraulic cylinder 25 supported on a base stand 1a for moving up and down this press table 24, and this hydraulic cylinder 25 temporarily compresses and laminates the sheet piece, and the temporarily compressed sheet piece is pressed by a final compression press 26 as required.

On the top of the carrier plate 23, a low-viscosity or heat-peeling glue is applied, and the sheet piece is adhered thereto, and the sheet piece can be peeled off without damaging when removing the laminated sheet piece from the carrier plate 23. Instead of applying the glue directly on the carrier plate 23, for example, a double-side adhesive sheet coated with low-viscosity or heat-peeling glue may be adhered to the carrier plate 23, and the sheet piece may be laminated and compressed thereon.

In this case, in the midst of laminating a specified number of sheet pieces, when laminating other sheet such as a dummy sheet on which electrode pattern is not printed, the carrier plate 23 is discharged from the press table 24, and the sheet prepared by the blank sheet feed device 27 may be put on the laminated body on the carrier plate 23.

The carrier plate 23 pressed by the final compression press 26 before the specified number of sheets are laminated is returned to the press table 24 by the carrier plate conveyors 28, 29, 30, whereas the carrier plate 23 laminating the specified number of sheet pieces is pressed, as required, by the final compression press 26, and put into a carrier plate storage device 32.

Figure 3:
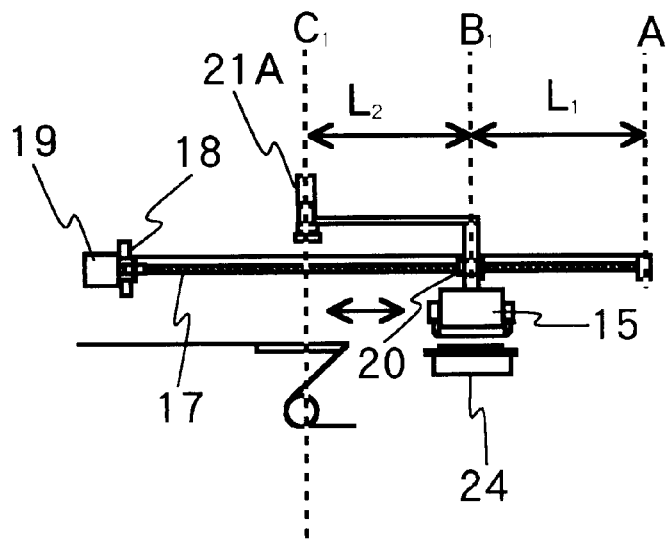
FIG. 3 is an explanatory illustration of operating principle of the manufacturing apparatus of thin film laminated article according to the embodiment of the invention, showing a starting state.
Figure 4:
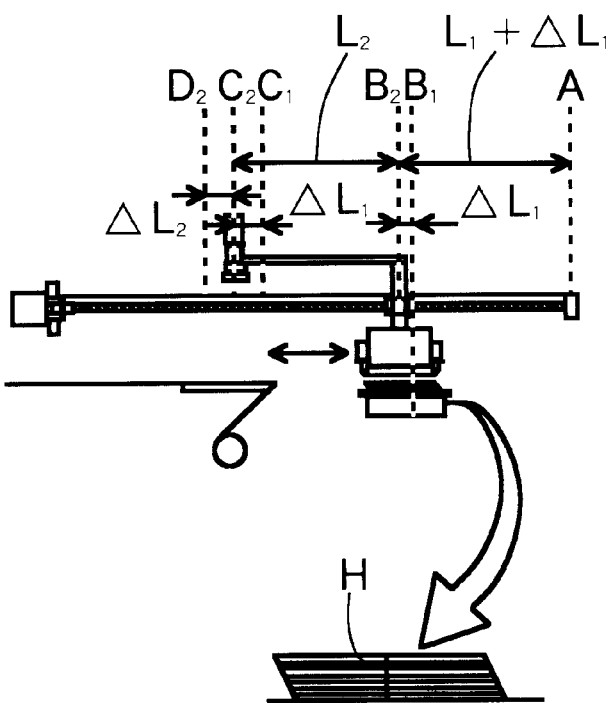
FIG. 4 is an explanatory illustration of operating principle of the manufacturing apparatus of electronic component according to the embodiment of the invention, showing a state after a specified time.
Figure 5:
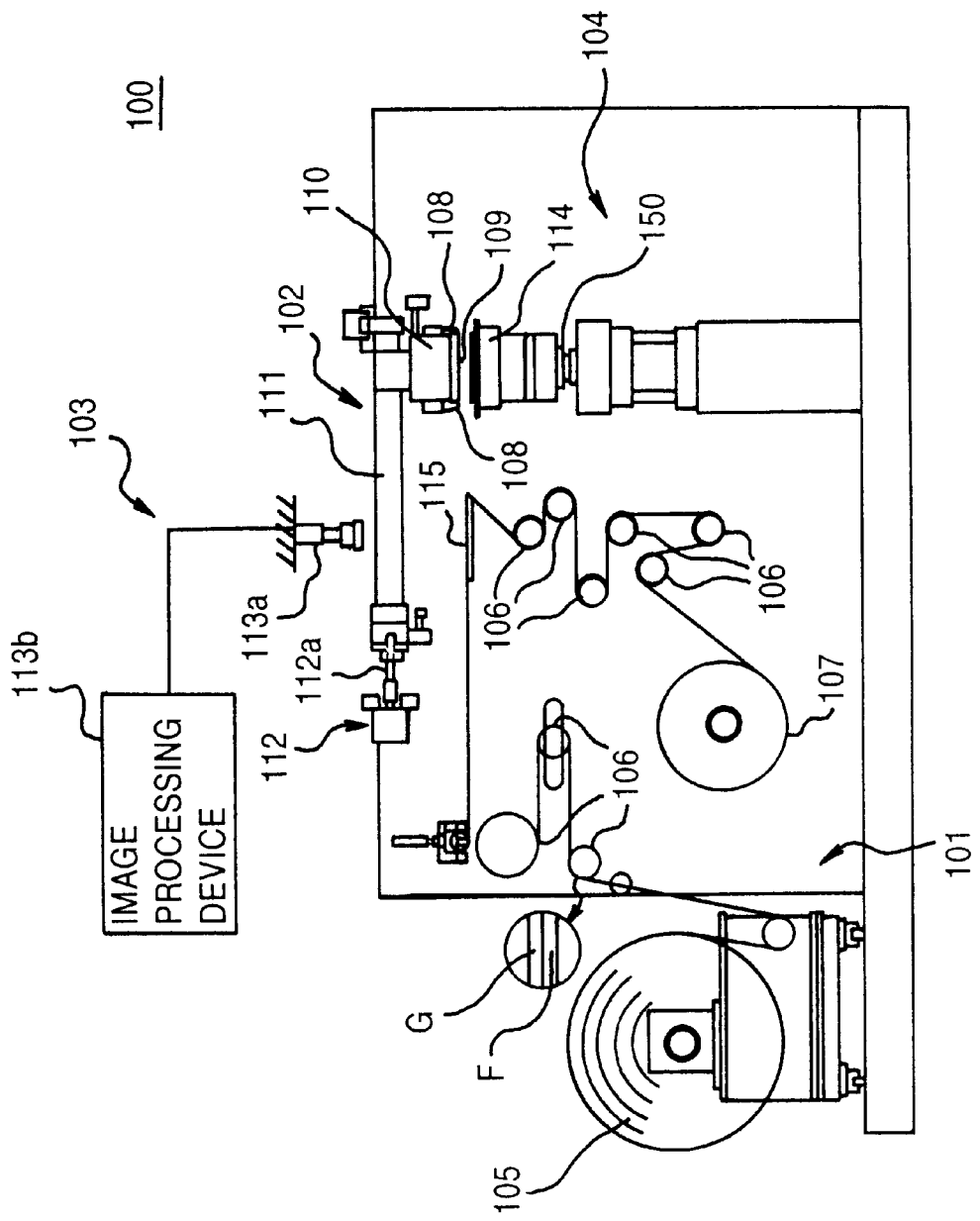
FIG. 5 is a front view showing a schematic constitution of a conventional manufacturing apparatus of thin film laminated article.
Figure 6:
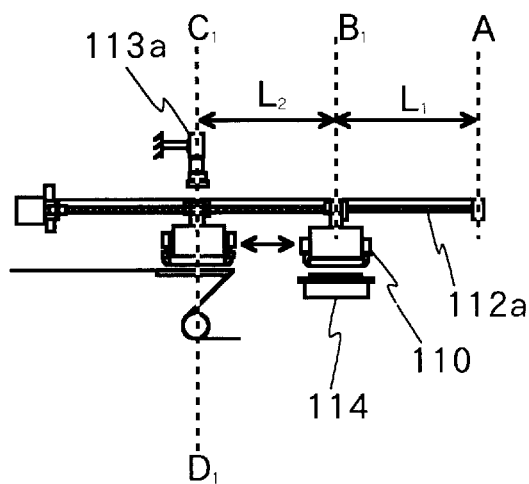
FIG. 6 is a illustration explaining problems of the conventional manufacturing apparatus of thin film laminated article, corresponding to FIG. 3.
Figure 7:
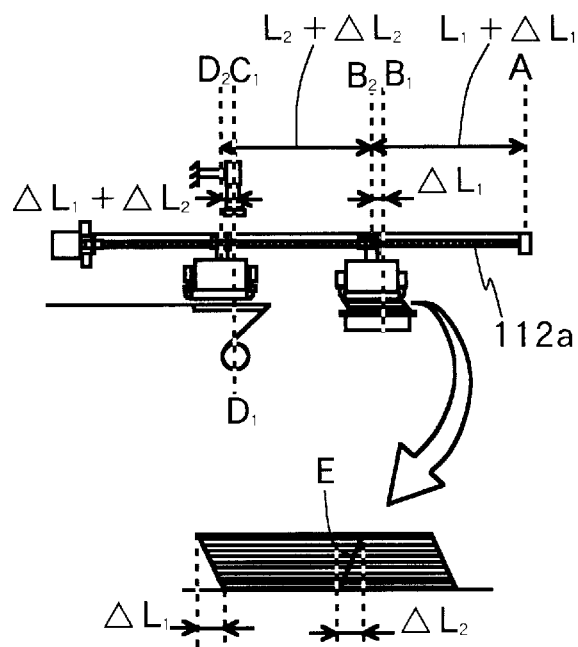
FIG. 7 is an illustration explaining problems of the conventional manufacturing apparatus of electronic component, corresponding to FIG. 4.

Referring next to FIG. 3 and FIG. 4, the principle of positioning the conveying unit 15 by the positioning mechanism 4 is explained below.

FIG. 3 shows a starting state of the manufacturing apparatus 1. FIG. 4 shows a state after a specific number of sheet pieces are laminated.

In FIG. 3 and FIG. 4, point A denotes the bearing position of the ball-screw shaft 17. Point B1 indicates a reference position where the conveying unit 15 is stopped at the laminating position, that is, the center of the press table 24, and the distance from point A to point B1 is L1.

Point B2 shows the position of the conveying unit 15 actually stopped at the laminating position at the point in FIG. 4. That is, in the state in FIG. 3, the position of the conveying unit 15 coincides with the center of the press table 24, but in the state in FIG. 4, the stopping position at the laminating position of the conveying unit 15 is point B2 deviated from point B1 by ΔL1 in the leftward direction in the drawing due to effect of thermal expansion.

Point C1 shows the position of the CCD imaging device 21A when the conveying unit 15 is at point B1 upon start of the manufacturing apparatus 1. This position is also the reference position at cut-off position of the positioning mark printed on the ceramic sheet G. Point C1 is a point moving from point B1 by L2 in the leftward direction in the drawing.

Point C2 is the position of the CCD imaging device 21A at the point in FIG. 4. The CCD imaging device 21A is coupled to the conveying unit 15 through the ball female screw 20 by means of support fitting 21a, and this support fitting 21a is free from effect of friction heat and does not elongate due to thermal expansion, and therefore the distance between point C2 and point B2 may be regarded to be L2.

Herein, supposing the number of pulses of the servo motor 19 for moving the conveying unit 15 by distance L2 when starting up the manufacturing apparatus 1 to be NL2, at the point in FIG. 4, by this number of pulses NL2, the conveying unit 15 is moved by a distance (L2+ΔL2). Therefore, to move the conveying unit 15 at point B2 by distance L2 in the leftward direction in the drawing, the moving unit 15 moves a distance of L2+ΔL2, moving from point A to point D2 at L1+L2+(ΔL1+ΔL2) in the leftward direction in the drawing.

At the point in FIG. 4, however, since the CCD imaging device 21A is at point C2 deviated from the original reference position of point C1 by ΔL1 in the leftward direction in the drawing, correcting the moving distance L2 of the conveying unit 15 depending on the image information of the positioning mark developed by this CCD imaging device 21A, −ΔL1 is added to the original correction amount, and the moving distance L2 is corrected. Therefore, assuming the deviation of the positioning mark from point C1 to be 0, the conveying unit 15 moves a distance of (L2+ΔL2)−ΔL1 from point B2 when moving to the cut-off position.

The reference position of the positioning mark at this time is at a position of a distance of (L2−ΔL1) from point B2 in the leftward direction in the drawing, and therefore the position of the positioning mark on the ceramic sheet G held by the conveying unit 15 is a position of (L2−ΔL1) from the center of the conveying unit 15, that is, a position deviated by L2 in the rightward direction.

When returning to the laminating position in this state, the position of the conveying unit 15 is point B2, that is, a position at a distance of (L1+ΔL1) in the leftward direction in the drawing from point A, and therefore the position of the positioning reference mark at this time is a position of a distance of (L1+ΔL1−ΔL2) in the leftward direction in the drawing from point A.

By adjusting the configuration of members so that ΔL1 and ΔL2 may be similar values, it is possible to adjust so that positioning marks may be aligned in the vertical direction as indicated by line segment H in the drawing, that is, to prevent deviation of electrode patterns of sheet pieces to be laminated.

According to experiments by the present applicant, when the temperature is 20 degree C, for about 25 minutes from start of the manufacturing apparatus 1, the temperature of the ball-screw shaft 17 rises, and in the prior art, ΔL1 was about 60 μm, and the deviation of electrode patterns of laminated sheet pieces was similar at maximum, and in the manufacturing apparatus 1 of the embodiment, by nearly equalizing the distance L1 and distance L2, the deviation of electrode patterns was controlled to 0.

Thus, in the embodiment, the CCD imaging device 21A for imaging the positioning mark printed corresponding to the electrode pattern on the ceramic sheet is coupled to the conveying unit 15, and is designed to move together with this conveying unit 15, it is effective to prevent deviation of electrode patterns of laminated sheet pieces due to change of position of the conveying unit 15 by thermal expansion of the ball-screw shaft 17 by friction heat.

Examples of thin film laminated articles manufactured by the manufacturing apparatus 1 of the embodiment include laminated ceramic capacitor, laminated ceramic varistor, laminated ceramic resistor, laminated piezoelectric actuator, piezoelectric transformer, laminated ceramic substrate, and other laminated ceramic products, and it must be noted that the manufacturing method of thin film laminated articles of the invention is also applicable to manufacture of other materials than ceramics.

According to the invention as described herein, if the holding and conveying means is conveyed to a position deviated from a preset cut-off position due to thermal expansion of ball-screw shaft of the ball-screw mechanism, by the correction moving distance obtained by processing the image taken by the imaging device, the holding and conveying means can be positioned at a specified position. It hence provides an excellent effect of elimination of adverse effects of thermal expansion of ball-screw shaft on the product precision.

I claim:

1. A manufacturing method of thin layer laminated article characterized by being mounted on a conveying medium of thin film shape and conveying and cutting the thin film sheet to shape into a specified size to obtain a thin film sheet piece, conveying and laminating said thin film sheet piece at a laminating position by a ball-screw mechanism, and adjusting a position of the conveying medium, wherein, in a starting condition and at the laminating position, the conveying medium is disposed at a center of a press table while imaging means connected to the conveying medium and operative to move synchronously therewith is disposed at a separation distance from the center of the press table at a cutting position in precise alignment at a precise alignment state over a positioning mark printed on said thin film sheet and, in a thermally expanded condition and at the laminating position, the conveying medium is disposed at a thermally expanded distance away from the center of the press table at a displaced center of the press table towards the cutting position while the imaging device at the cutting position is disposed at the separation distance from the displaced center of the press table and disposed offset from the precise alignment state, the position of the conveying medium being adjusted as the conveying medium moves to the cutting position from the laminating position when in the thermally expanded condition so that the conveying medium is disposed at the precise alignment state when stopped at the cutting position.

2. The manufacturing method of thin layer laminated article of claim 1, wherein the center of said laminating position is the middle position between the center of said cutting position and the bearing position of the ball-screw shaft leading end of said ball-screw mechanism.

3. A manufacturing apparatus of thin layer laminated article comprising a conveying mechanism for conveying a conveying medium of thin film shape on which a thin film sheet is mounted, cutting means for cutting said thin film sheet into a thin film sheet piece of a specified size, holding and conveying means for holding said thin film sheet piece and conveying from a cutting position to a laminating position, a ball-screw mechanism for conveying said holding and conveying means from said cutting position to the laminating position, imaging means designed to move in synchronism with the move of said holding and conveying means, image processing means for processing the image from said imaging means, and means for adjusting a position of the conveying medium, wherein, in a starting condition and at the laminating position, the holding and conveying means is disposed at a center of a press table while imaging means connected to the holding and conveying means and moving synchronously therewith is disposed at a separation distance from the center of the press table at the cutting position in precise alignment at a precise alignment state over a positioning mark printed on said thin film sheet and, in a thermally expanded condition and at the laminating position, the holding and conveying means is disposed at a thermally expanded distance away from the center of the press table at a displaced center of the press table towards the cutting position while the imaging device at the cutting position is disposed at the separation distance from the displaced center of the press table and displaced offset from the precise alignment state, the position of the holding and conveying means being adjusted by the adjusting means as the holding and conveying means moves to the cutting position from the laminating position when in the thermally expanded condition so that the conveying medium is disposed at the precise alignment state when stopped at the cutting position.

4. The manufacturing apparatus of thin layer laminated article of claim 3, wherein the center of said laminating position is the middle position between the center of said cutting position and the bearing position of the ball-screw shaft leading end of said ball-screw mechanism.

5. The manufacturing apparatus of thin layer laminated article of claim 3, wherein said cutting means includes a first cutting mechanism for cutting said thin film sheet in the conveying direction and a second cutting mechanism for cutting in a direction orthogonal to said conveying direction, and said second cutting mechanism is disposed on said holding and conveying means.

* * * * *